United States Patent
Nelson

(10) Patent No.: US 8,949,933 B2
(45) Date of Patent: Feb. 3, 2015

(54) CENTRALIZED MANAGEMENT OF TECHNICAL RECORDS ACROSS AN ENTERPRISE

(75) Inventor: Steven M. Nelson, Burlington, VT (US)

(73) Assignee: International Business Machines Corporation, Armonk, NY (US)

(*) Notice: Subject to any disclaimer, the term of this patent is extended or adjusted under 35 U.S.C. 154(b) by 1452 days.

(21) Appl. No.: 11/505,000

(22) Filed: Aug. 15, 2006

(65) Prior Publication Data

US 2008/0046434 A1   Feb. 21, 2008

(51) Int. Cl.
G06F 21/00   (2013.01)
G06F 21/62   (2013.01)

(52) U.S. Cl.
CPC .................. *G06F 21/6218* (2013.01)
USPC .................. 726/2; 726/28; 713/193

(58) Field of Classification Search
USPC .......... 726/2, 28; 713/193; 707/9, 10
See application file for complete search history.

(56) References Cited

U.S. PATENT DOCUMENTS

| | | | |
|---|---|---|---|
| 5,664,178 A * | 9/1997 | Sinofsky ............... | 1/1 |
| 5,778,390 A * | 7/1998 | Nelson et al. .......... | 1/1 |
| 6,366,915 B1 * | 4/2002 | Rubert et al. ........... | 707/10 |
| 6,839,843 B1 | 1/2005 | Bacha et al. | |
| 6,954,748 B2 | 10/2005 | Dettinger et al. | |
| 7,669,237 B2 * | 2/2010 | Shahbazi .............. | 726/22 |
| 2002/0077846 A1 | 6/2002 | Bierbrauer et al. | |
| 2003/0070101 A1 * | 4/2003 | Buscemi ............... | 713/202 |
| 2003/0079051 A1 * | 4/2003 | Moses et al. ........... | 709/328 |
| 2003/0154381 A1 * | 8/2003 | Ouye et al. ............ | 713/182 |
| 2003/0161003 A1 * | 8/2003 | Herbert ................. | 358/1.18 |
| 2004/0064484 A1 | 4/2004 | Polan et al. | |
| 2004/0186842 A1 | 9/2004 | Wesemann | |
| 2004/0267750 A1 * | 12/2004 | Aaron .................. | 707/9 |
| 2005/0102308 A1 | 5/2005 | Sykes et al. | |
| 2005/0131905 A1 | 6/2005 | Margolus et al. | |
| 2005/0149535 A1 * | 7/2005 | Frey et al. ............. | 707/100 |
| 2005/0268334 A1 * | 12/2005 | Hesselink et al. ....... | 726/11 |
| 2006/0136985 A1 * | 6/2006 | Ashley et al. .......... | 726/1 |
| 2006/0184996 A1 * | 8/2006 | Condon ................ | 726/2 |
| 2006/0200508 A1 * | 9/2006 | Telkowski et al. ...... | 707/204 |
| 2006/0294103 A1 * | 12/2006 | Wood .................. | 707/9 |
| 2008/0027737 A1 * | 1/2008 | Watkins ............... | 705/1 |
| 2008/0027750 A1 * | 1/2008 | Barkeloo et al. ........ | 705/1 |

* cited by examiner

*Primary Examiner* — Michael Pyzocha
(74) *Attorney, Agent, or Firm* — Yudell Isidore PLLC; John Pivnichny

(57) ABSTRACT

A method, system and computer-readable medium for managing technical records across an enterprise are presented. The method includes controlling access to a technical records repository through a centralized technical records security service, wherein the technical records security service controls access to multiple independent technical records repositories for an enterprise, wherein technical records must follow a strict naming convention set by the enterprise, and wherein the technical records must contain a specific security classification level set by the enterprise.

15 Claims, 15 Drawing Sheets

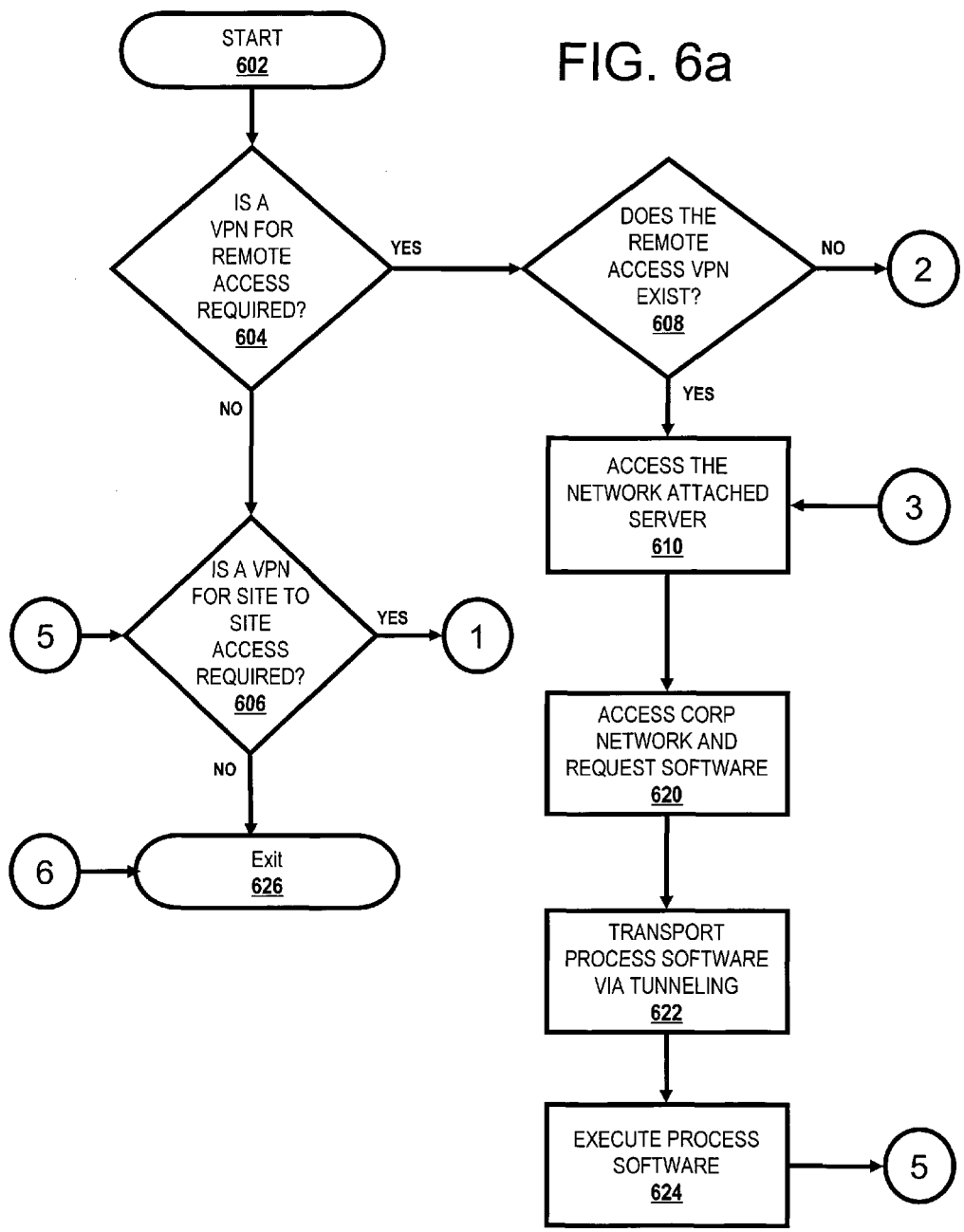

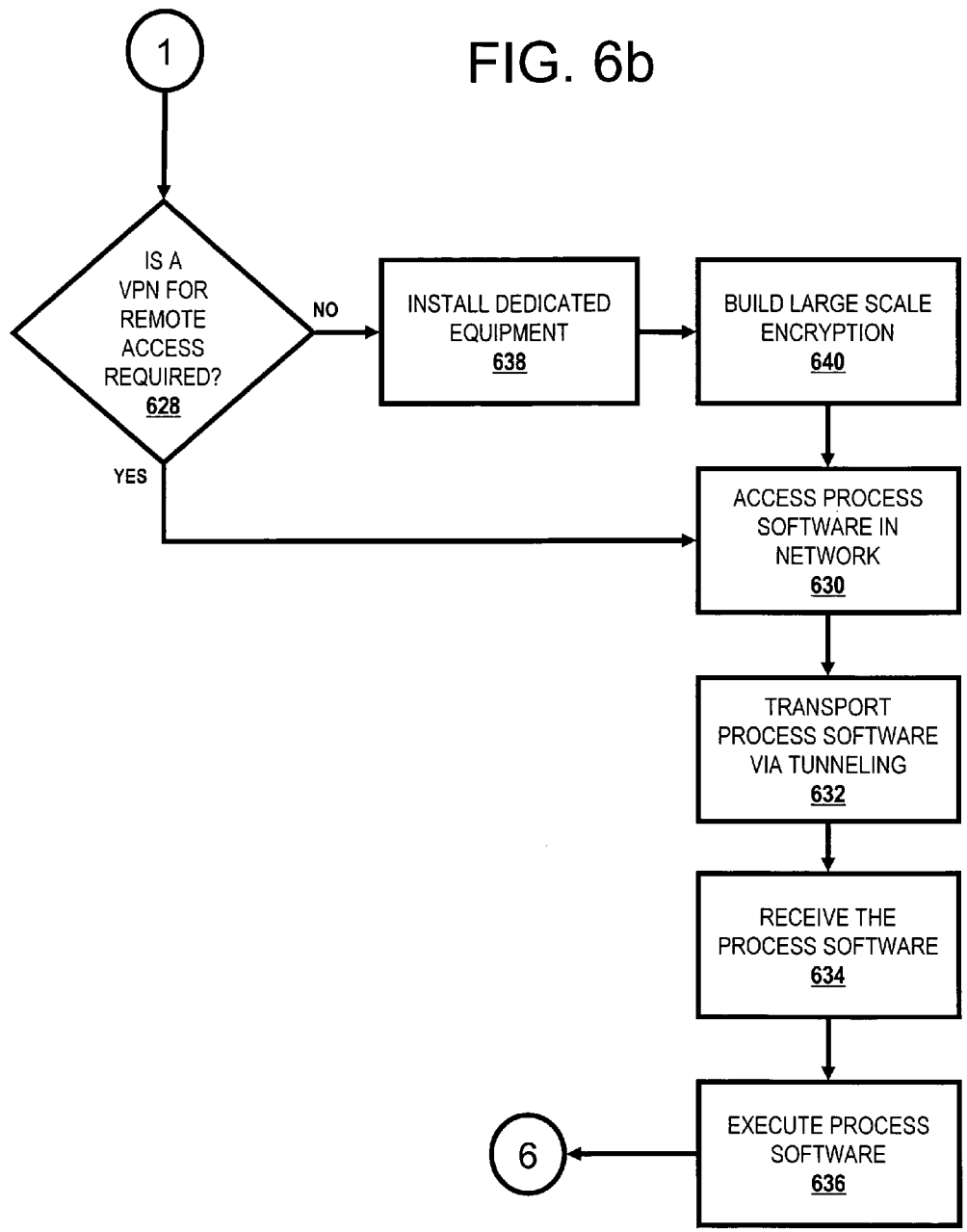

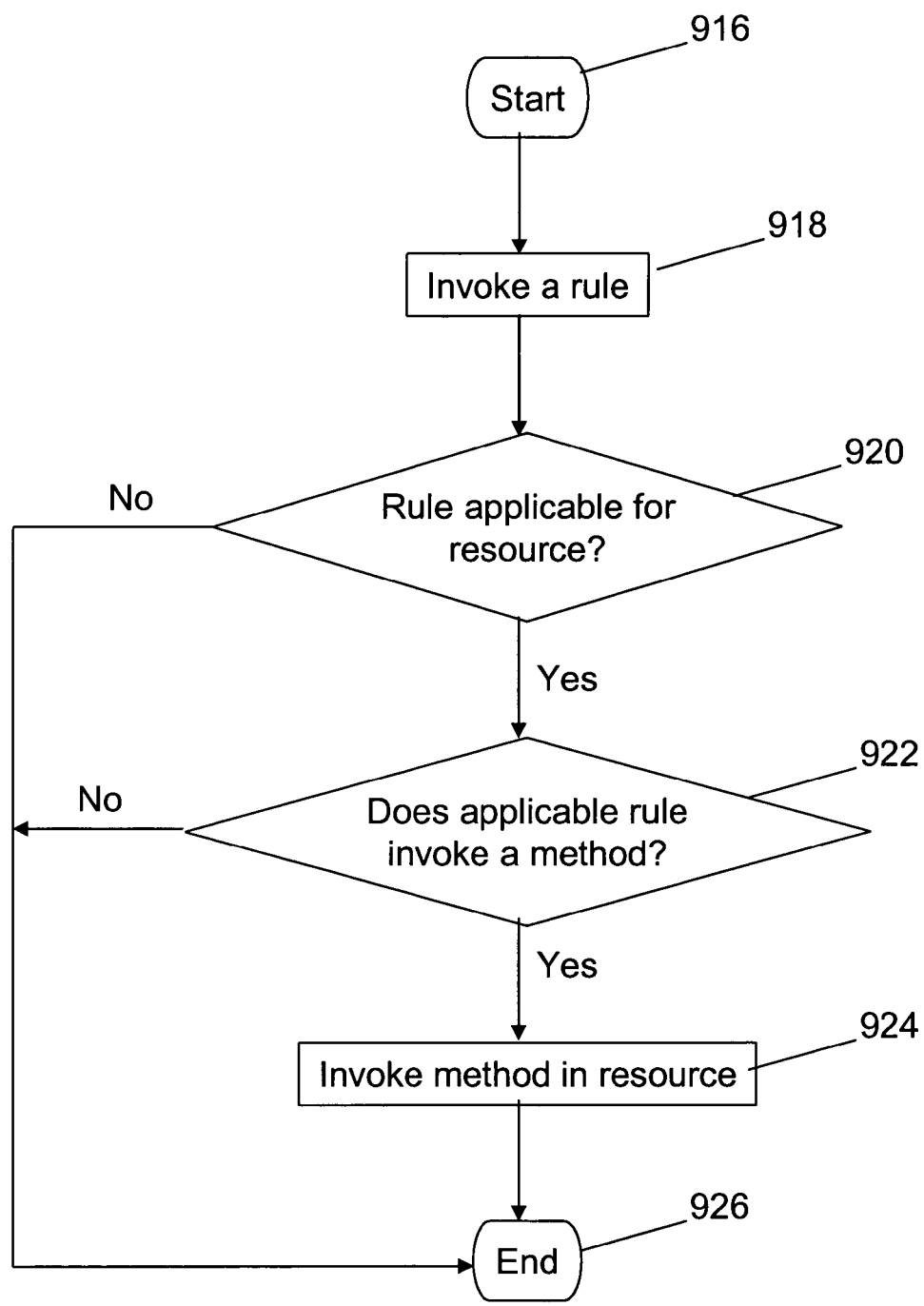

CENTRALIZED MANAGEMENT OF TECHNICAL RECORDS ACROSS AN ENTERPRISE

BACKGROUND OF THE INVENTION

1. Technical Field

The present invention relates in general to the field of computers, and more particularly to data storage management. Still more particularly, the present invention relates to controlling access to technical records through the use of a centralized security service.

2. Description of the Related Art

Technical records are data structures, in a data repository system, that conform to specific naming and security guidelines set by an enterprise. To access technical records, a requesting user must provide a security construct that affords the user the permission and ability to access requested technical records. The current approach to many software solutions is to use a Service-Oriented Architecture (SOA), which defines services used in a scalable manner. That is, in an SOA environment, resources such are software are made available to a user in a manner that allows a user to combine specific software components to develop a desired application/system. However, there are currently no known Service-Oriented Architecture approaches that provide a method and process to centralize managing technical records across an organization. Rather, in the prior art, an enterprise must adopt a number of "one-off" strategies whenever trying to perform data management related tasks for technical records. These strategies involve the following problems.

First, the organization must rely on the file system's and/or FTP server's authentication features. This limits the organization's ability to adopt and utilize a company wide authentication/authorization strategy, because it is forced to rely on the physical server's authentication abilities, rather than on a global identifier framework.

Second, there is no manageable way to make a data migration effort transparent to the end user community, since the end user must connect and communicate with a physical server, rather than an identified conceptual repository. This means that there is great potential to disrupt daily business needs if the organization must migrate their technical records from one server to another.

Third, without a centralized automatic naming and storage convention system, there is no practical way to enforce and ensure that end users follow the naming and storage conventions determined by the organization.

Fourth, with communication only taking place at the local physical server level, there is no global method of providing consistent/uniform data integrity verification to the entire end user community of the organization.

SUMMARY OF THE INVENTION

To address the problems stated herein, the present invention provides a method, system and computer-readable medium for centralizing technical records security. In one embodiment, the method includes the step of controlling access to a technical records repository through a centralized technical records security service, wherein the technical records security service controls access to multiple independent technical records repositories for an enterprise, wherein technical records must follow a strict naming convention set by the enterprise, and wherein the technical records must contain a specific security classification level set by the enterprise. Access to the technical records repository may be controlled, for a requesting user, by the centralized technical records security service wherein the centralized technical records security service determines which authorization strategy, from a plurality of authorization strategies, is appropriate for the requesting user.

In one embodiment, the method further includes the steps of: receiving, from the requesting user, an identifier name of a repository with which the requesting user desires to access requested data; based on the identifier name received from the requesting user, determining an actual name for one or more physical servers that holds the requested data, wherein the centralized technical records security service hides a name and pathway to the physical server(s), which holds the requested data, from the requesting user; automatically applying, by the centralized technical records security service, naming and storage conventions that name a file being stored and generate a directory path for where the file is to be stored; and transmitting a file name and directory path for the file to the requesting user for use by a client program in the actual communication protocol with the physical server(s). In one embodiment, if there are multiple physical servers holding copies of the requested file, then a download of the requested file is accomplished by a client machine attempting to access the requested file from the multiple physical servers using a priority schema. That is, the client machine first tries to download the requested data from a physical server that has a highest priority descriptor. If that download fails, then a next server having the next highest priority descriptor is tried. The process continues down the priority listing of servers until a successful download of the requested file is sent to the client machine.

The method may further include the steps of utilizing a technical records data integrity service, which is part of the technical records security service, for: applying an integrity rule, which describes which integrity algorithm, must be applied to the requested data; and logging a record of interface information previously used when retrieving the requested data.

In one embodiment, the method further includes the steps of receiving, by an Assistance Allocation Manager (AAM), an Assistance Initiating Data (AID) from a resource in a data processing system; and in response to receiving the AID, executing a rule, in the AAM, that is specific for the AID and the resource that sent the AID, wherein executing the rule in the AAM causes the steps described herein to be executed for the resource that sent the AID.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIGS. 6*a-c* are flow-charts showing steps taken to deploy in a Virtual Private Network (VPN) software that is capable of executing the steps shown in FIGS. 1-2;

FIGS. 9*a-b* illustrate a process for utilizing one or more rules to invoke the methods described by the present invention, including but not limited to the steps described in FIGS. 1-2.

DETAILED DESCRIPTION OF THE PREFERRED EMBODIMENT

Figure 1:
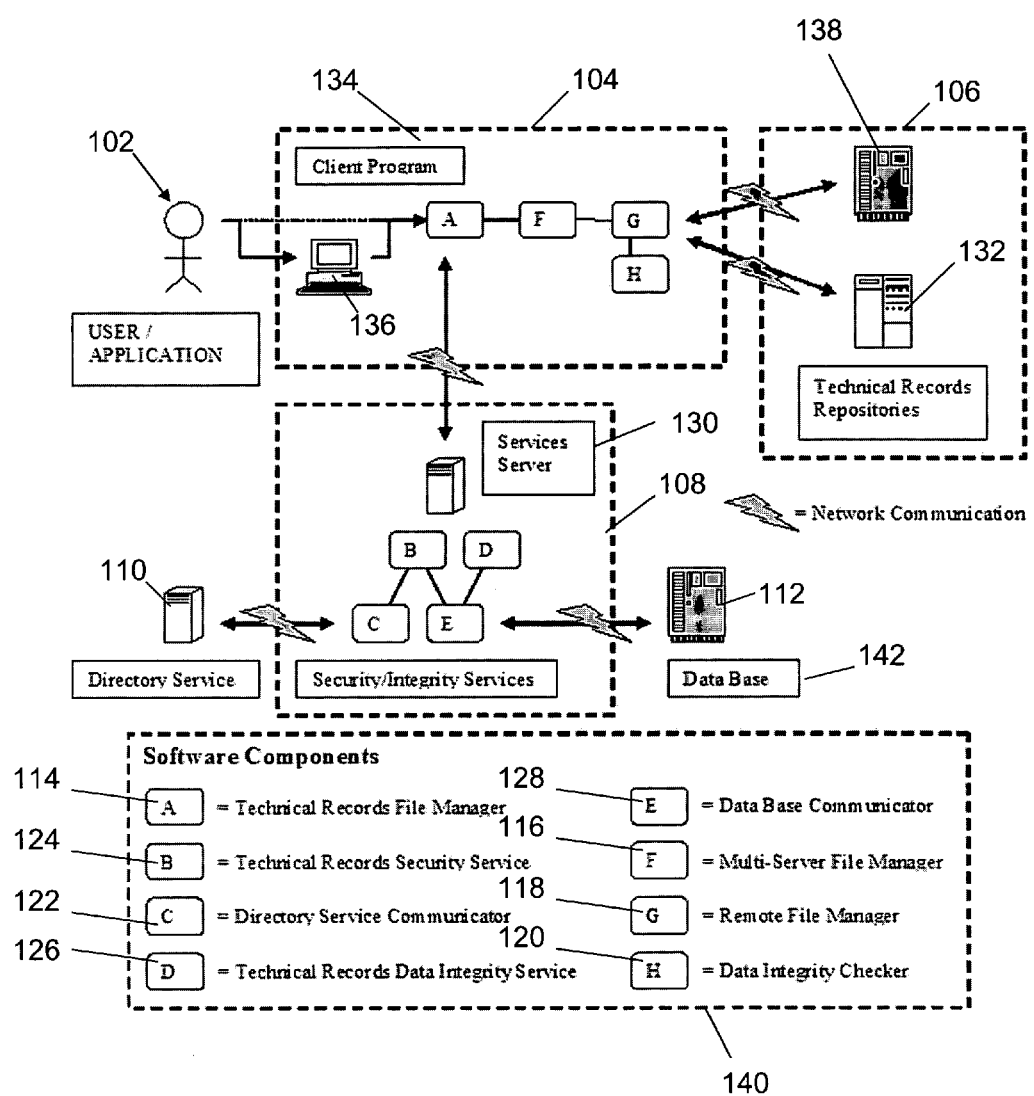
FIG. 1 depicts an exemplary enterprise computing environment in which technical records are centrally managed in accordance with the present invention.

With reference now the figures, and in particular to FIG. 1, an exemplary enterprise computing environment 100, as used by the present invention, is presented. Through the use of a directory service 110 and a database 112, a security/integrity services system 108, using a services server 130, provides a management service to control access (requested by a client program 134 in a client system 104) to technical records in a technical records repository 132. This functionality is provided through the use of software components 140, which are now described.

Software component A (114) is a technical records file manager. The technical records file manager component is responsible for managing the overall communication and tracking of "technical records" files to and from remote technical records repositories 132. Software component A completes the following steps in the present invention. First, software component A calls a technical records security services system 108 to provide user credentials and intentions needed to access technical records in technical records system 106. Second, software component A sets up and runs Multi-Server File Communication between client system 104 and technical records system 106. Third, software component A calls a technical records data integrity service 142, which provides details of past transactions between client system 104 and technical records system 106. Fourth, software component A provides feedback/results to the end user regarding success (or failure) in accessing requested data from the technical records repositories 132.

Software component B (124) is a technical records security service. Software component B requires user credentials (such as ID and Password), along with the users intentions (what repository they want to communicate with and how they would like to communicate with it), to authenticate/authorize (validate credentials of) the user. If the user passes software component B's scrutiny, then software component B returns a resource bundle containing all resources needed to perform the actual communication being requested. The resources in the returned resource bundle contain details on whether a multi-server communication must take place; the naming and storage conventions that are to be used (to describe exactly how a file is to be named when stored); and exactly where the file is to be stored (including the physical location/address) on a remote repository (technical records repositories 132).

Software component C (122) is a directory service communicator. Software component C provides the following functions (which may be consolidated into single method). First, software component C authenticates a user who is requesting data from the technical records repositories 132. This authentication is performed by receiving, by software component C, the requesting user's identifier (ID) and password, and authenticating the user's ID by utilizing an enterprise-wide security strategy. Second, once the requesting user is authenticating, the software component C authorizes the requesting user to access the requested data. After receiving the user's ID and password, the software component C authorizes the requesting user based on the communication transaction he has requested. That is, the user may be authorized (per information accessed from a directory service 110 by software component C) to access only specific types and/or names of technical records.

Software component D (126) is a technical records data integrity service. Software component D provides data integrity validation and/or verification, along with logging of any critical information about the communication. This may be a collection of light weight services that provide an interface into some long term data storage facility.

Software component E (128) is a data base communicator. Software component E provides capability for storing/retrieving transaction details to/from a database 112. Database 112 is defined as a long term storage facility utilized by an enterprise. Note that while software component E may be any type of long term storage facility communicator, preferably software component E is part of a traditional database management system.

Software component F (116) is a multi-server file manager. Software component F provides the role of managing multi-server communication between client system 104 and technical records system 106, and between client system 104 and security system 108. Software component F manages multiple threads for uploading to multiple remote servers (i.e., multiple data servers 138), and manages the priority ranking of these servers when attempting to download a resource that is available on multiple remote servers.

Software component G (118) is a remote file manager. Software component G performs the actual file communication transactions between the client's machine (client system 104) and a remote repository (technical records repositories 132 via data servers 138).

Software component H (120) is a data integrity checker. Software component H provides data integrity checking capability on the communication (requests from and responses to client system 104 for technical records) being performed (such as checksum calculations, etc.).

Figure 2:
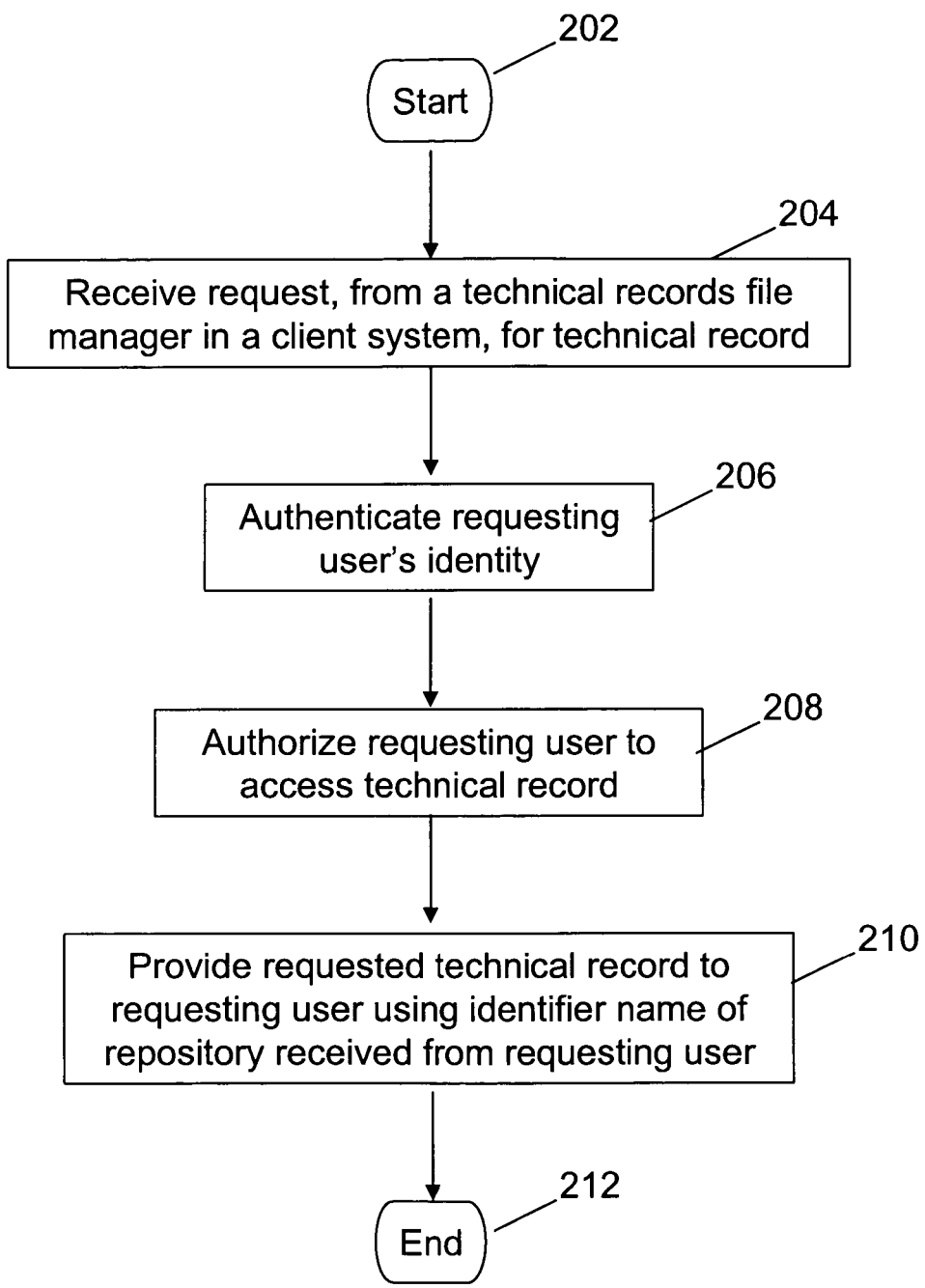
FIG. 2 is a flow-chart of exemplary steps taken to centrally manage technical records in accordance with the present invention.

With reference now FIG. 2, a flow-chart of exemplary steps taken by the present invention is presented. After initiator block 202, a request for a technical record is received (intercepted) by a centralized technical records security service (block 204). The requested technical record is a record that follows a strict naming convention that is set by an enterprise. Furthermore, the requested technical record is at a specific security classification level that has been set by the enterprise. The centralized technical records security service then authenticates (block 206) the identity of the requesting user, who is requesting the technical record, by examining authentication credentials (e.g., password, unique identifier, encryption hash, etc.) of the requesting user. Upon verification of the identity of the requesting user, the centralized technical records security service authorizes the requested user to access the technical records repository that holds the requested data (block 208). In a preferred embodiment, however, the requesting user never actually sees the physical name of the server(s) that contains the requested data, nor does the requesting user see the pathway to that technical records repository. Rather, the centralized technical records security service matches the name and pathway to the technical records repository with an identifier name used by the requesting user. This matching of the technical records repository with the identifier name may be accomplished, in the centralized technical records security service, by any algorithm or method that is appropriate for the technical records repository that is being accessed. Examples of such algorithms or methods include, but are not limited to: using a lookup table (that matches the name of the physical location of the technical records repository with the identifier name); using a configuration file (that points to the technical records repository); a coded algorithm (that may be unique for the technical records repository's storage system), etc. That is, the choice of the method/algorithm should be based on organization naming/storage conventions used by the technical records repository. Based on this information, the centralized technical records security service accesses the requested data for the requesting user (block 210), and the process ends (terminator block 212).

Figure 3:
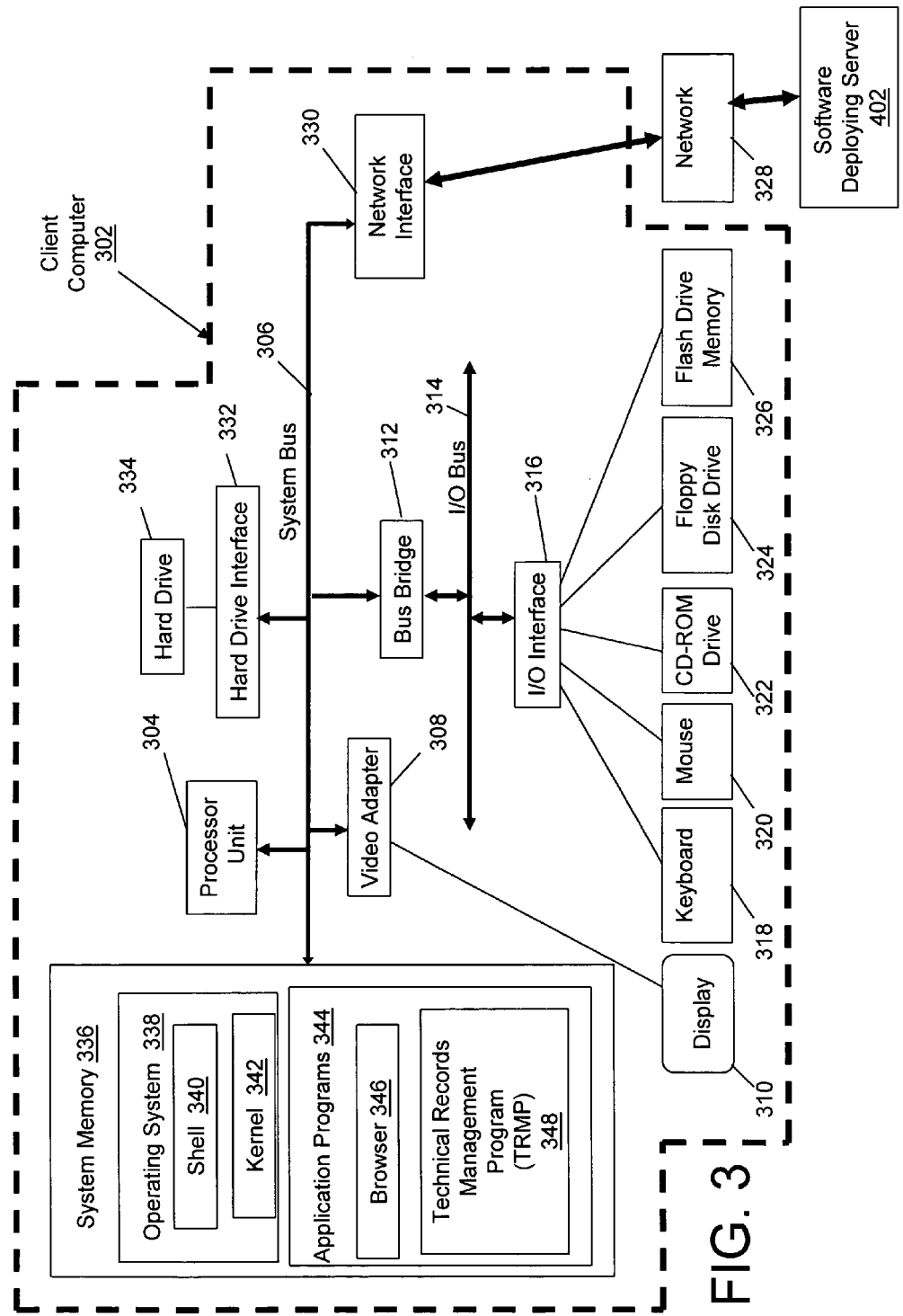
FIG. 3 depicts an exemplary client computer which can be utilized in accordance with the present invention.

With reference now to FIG. 3, there is depicted a block diagram of an exemplary client computer 302, in which the present invention may be utilized. Client computer 302 includes a processor unit 304 that is coupled to a system bus 306. A video adapter 308, which drives/supports a display 310, is also coupled to system bus 306. System bus 306 is coupled via a bus bridge 312 to an Input/Output (I/O) bus 314. An I/O interface 316 is coupled to I/O bus 314. I/O interface 316 affords communication with various I/O devices, including a keyboard 318, a mouse 320, a Compact Disk-Read Only Memory (CD-ROM) drive 322, a floppy disk drive 324, and a flash drive memory 326. The format of the ports connected to I/O interface 316 may be any known to those skilled in the art of computer architecture, including but not limited to Universal Serial Bus (USB) ports.

Client computer 302 is able to communicate with a software deploying server 402 via a network 328 using a network interface 330, which is coupled to system bus 306. Network 328 may be an external network such as the Internet, or an internal network such as an Ethernet or a Virtual Private Network (VPN).

A hard drive interface 332 is also coupled to system bus 306. Hard drive interface 332 interfaces with a hard drive 334. In a preferred embodiment, hard drive 334 populates a system memory 336, which is also coupled to system bus 306. System memory is defined as a lowest level of volatile memory in client computer 302. This volatile memory includes additional higher levels of volatile memory (not shown), including, but not limited to, cache memory, registers and buffers. Data that populates system memory 336 includes client computer 302's operating system (OS) 338 and application programs 344.

OS 338 includes a shell 340, for providing transparent user access to resources such as application programs 344. Generally, shell 340 is a program that provides an interpreter and an interface between the user and the operating system. More specifically, shell 340 executes commands that are entered into a command line user interface or from a file. Thus, shell 340 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 342) for processing. Note that while shell 340 is a text-based, line-oriented user interface, the present invention will equally well support other user interface modes, such as graphical, voice, gestural, etc.

As depicted, OS 338 also includes kernel 342, which includes lower levels of functionality for OS 338, including providing essential services required by other parts of OS 338 and application programs 344, including memory management, process and task management, disk management, and mouse and keyboard management.

Application programs 344 include a browser 346. Browser 346 includes program modules and instructions enabling a World Wide Web (WWW) client (i.e., client computer 302) to send and receive network messages to the Internet using HyperText Transfer Protocol (HTTP) messaging, thus enabling communication with software deploying server 402.

Application programs 344 in client computer 302's system memory also include a Technical Records Management Program (TRMP) 348. TRMP 348 includes code for implementing the processes described in FIGS. 1-2. In one embodiment, client computer 302 is able to download TRMP 348 from software deploying server 402.

The hardware elements depicted in client computer 302 are not intended to be exhaustive, but rather are representative to highlight essential components required by the present invention. For instance, client computer 302 may include alternate memory storage devices such as magnetic cassettes, Digital Versatile Disks (DVDs), Bernoulli cartridges, and the like. These and other variations are intended to be within the spirit and scope of the present invention.

Figure 4:
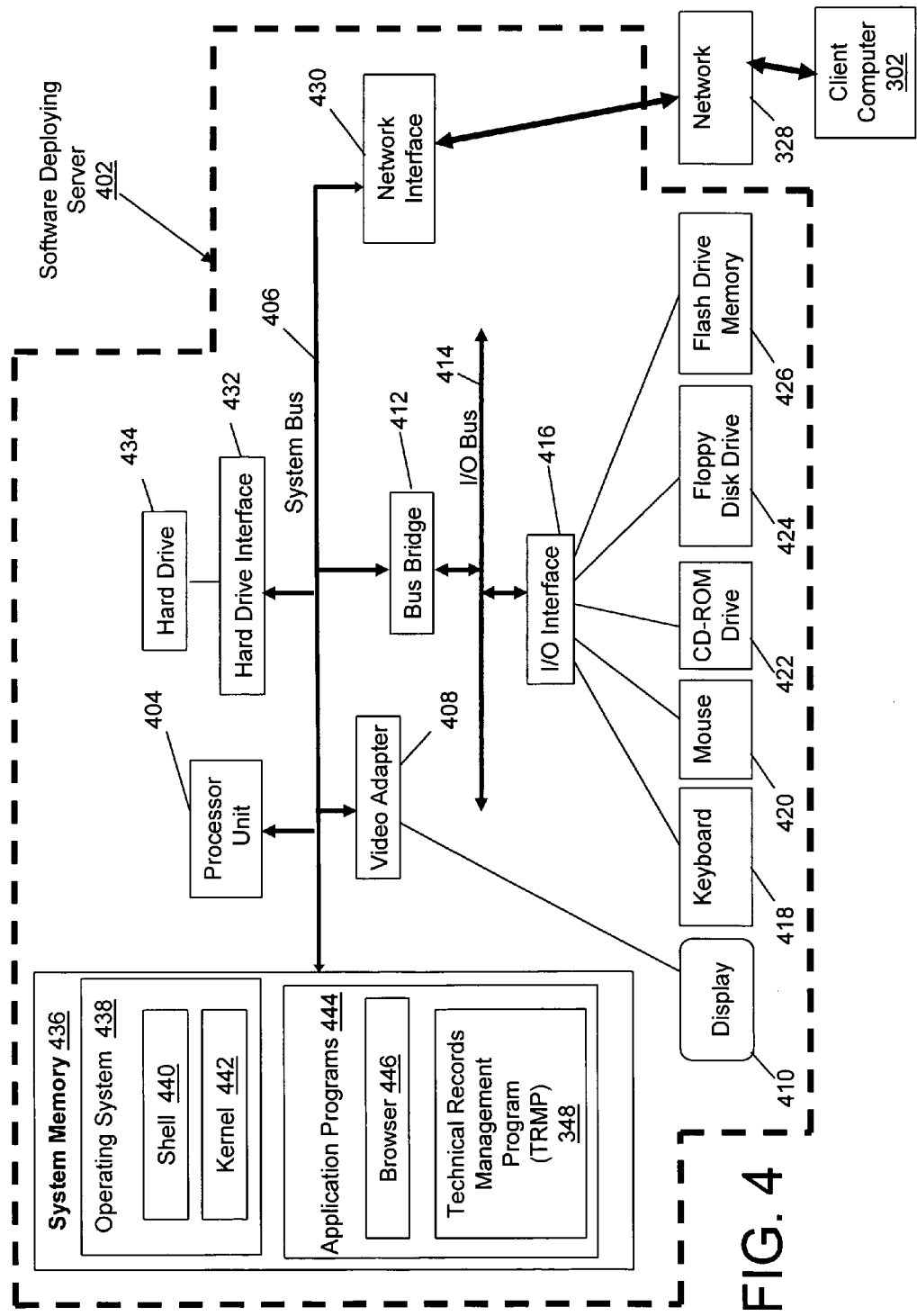
FIG. 4 illustrates a software deploying server that is capable of deploying software to the client computer shown in FIG. 3 to implement the present invention.

As noted above, TRMP 348 can be downloaded to client computer 302 from software deploying server 402, shown in exemplary form in FIG. 4. Software deploying server 402 includes a processor unit 404 that is coupled to a system bus 406. A video adapter 408 is also coupled to system bus 406. Video adapter 408 drives/supports a display 410. System bus 406 is coupled via a bus bridge 412 to an Input/Output (I/O) bus 414. An I/O interface 416 is coupled to I/O bus 414. I/O interface 416 affords communication with various I/O devices, including a keyboard 418, a mouse 420, a Compact Disk-Read Only Memory (CD-ROM) drive 422, a floppy disk drive 424, and a flash drive memory 426. The format of the ports connected to I/O interface 416 may be any known to those skilled in the art of computer architecture, including but not limited to Universal Serial Bus (USB) ports.

Software deploying server 402 is able to communicate with client computer 302 via network 328 using a network interface 430, which is coupled to system bus 406. Access to network 328 allows software deploying server 402 to deploy TRMP 348 to client computer 302.

System bus 406 is also coupled to a hard drive interface 432, which interfaces with a hard drive 434. In a preferred embodiment, hard drive 434 populates a system memory 436, which is also coupled to system bus 406. Data that populates system memory 436 includes software deploying server 402's operating system 438, which includes a shell 440 and a kernel 442. Shell 440 is incorporated in a higher level operating system layer and utilized for providing transparent user access to resources such as application programs 444, which include a browser 446, and a copy of TRMP 348 described above, which can be deployed to client computer 302.

The hardware elements depicted in software deploying server 402 are not intended to be exhaustive, but rather are representative to highlight essential components required by the present invention. For instance, software deploying server 402 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, software deploying server 402 performs all of the functions associated with the present invention (including execution of TRMP 348), thus freeing client computer 302 from having to use its own internal computing resources to execute TRMP 348.

Note that the architecture shown in detail in FIGS. 3-4 may be used by client computer 136, data server 138 and/or services server 130 shown in FIG. 1. Note further that services server 130 may function as a software deploying server 402, whose function is described herein.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

Thus, the method described herein, and in particular as shown and described in FIGS. 1-2, can be deployed as a process software from software deploying server 402 (shown in FIG. 4) to client computer 302 (shown in FIG. 3).

Figure 5A:
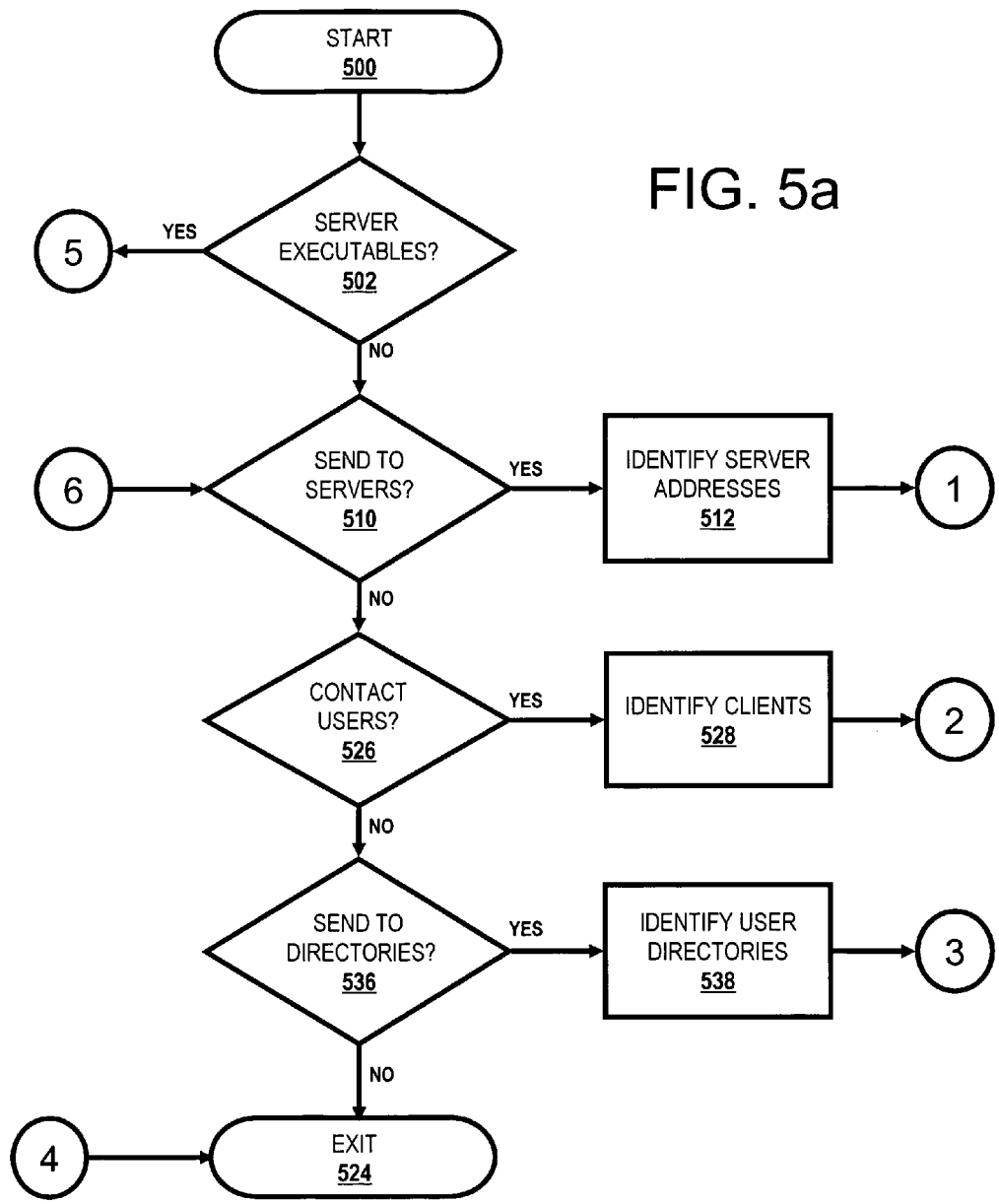
FIGS. 5*a-b* are flow-chart showing steps taken to deploy software capable of executing the steps shown in FIGS. 1-2.
Figure 5B:
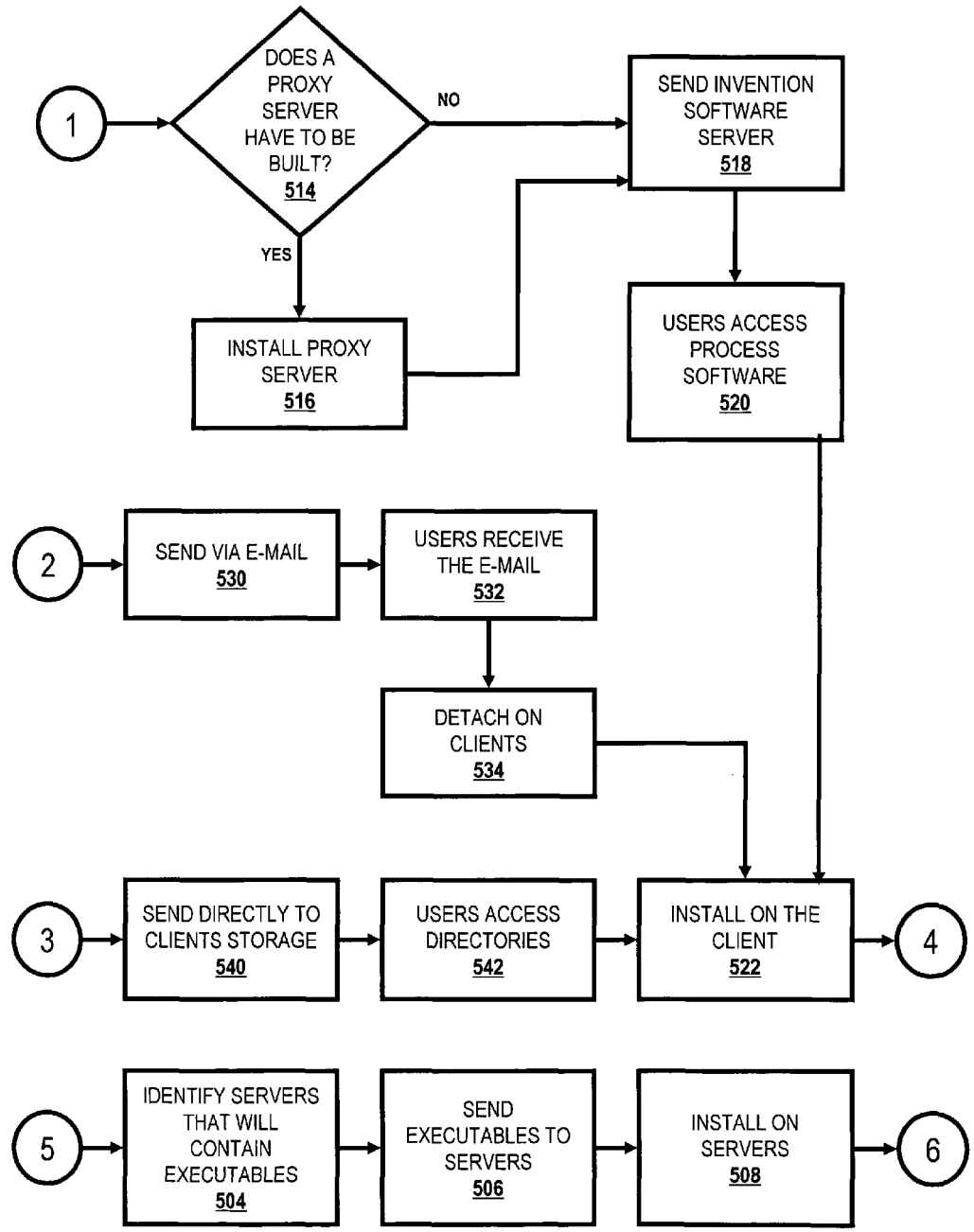

Referring then to FIGS. 5a-b, step 500 begins the deployment of the process software. The first thing is to determine if there are any programs that will reside on a server or servers when the process software is executed (query block 502). If this is the case, then the servers that will contain the executables are identified (block 504). The process software for the server or servers is transferred directly to the servers' storage via File Transfer Protocol (FTP) or some other protocol or by copying though the use of a shared file system (block 506). The process software is then installed on the servers (block 508).

Next, a determination is made on whether the process software is to be deployed by having users access the process software on a server or servers (query block 510). If the users are to access the process software on servers, then the server addresses that will store the process software are identified (block 512).

A determination is made if a proxy server is to be built (query block 514) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 516). The process software is sent to the servers either via a protocol such as FTP or it is copied directly from the source files to the server files via file sharing (block 518). Another embodiment would be to send a transaction to the servers that contained the process software and have the server process the transaction, then receive and copy the process software to the server's file system. Once the process software is stored at the servers, the users, via their client computers, then access the process software on the servers and copy to their client computers file systems (block 520). Another embodiment is to have the servers automatically copy the process software to each client and then run the installation program for the process software at each client computer. The user executes the program that installs the process software on his client computer (i.e., client computer 302) (block 522) then exits the process (terminator block 524).

In query step 526, a determination is made whether the process software is to be deployed by sending the process software to users via e-mail. The set of users where the process software will be deployed are identified together with the addresses of the user client computers (block 528). The process software is sent via e-mail to each of the users' client computers (block 530). The users then receive the e-mail (block 532) and then detach the process software from the e-mail to a directory on their client computers (block 534). The user executes the program that installs the process software on his client computer (block 522) then exits the process (terminator block 524).

Lastly a determination is made on whether the process software will be sent directly to user directories on their client computers (query block 536). If so, the user directories are identified (block 538). The process software is transferred directly to the user's client computer directory (block 540). This can be done in several ways such as, but not limited to, sharing of the file system directories and then copying from the sender's file system to the recipient user's file system or alternatively using a transfer protocol such as File Transfer Protocol (FTP). The users access the directories on their client file systems in preparation for installing the process software (block 542). The user executes the program that installs the process software on his client computer (block 522) and then exits the process (terminator block 524).

VPN Deployment

The present software can be deployed to third parties as part of a service wherein a third party VPN service is offered as a secure deployment vehicle or wherein a VPN is built on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 6C:
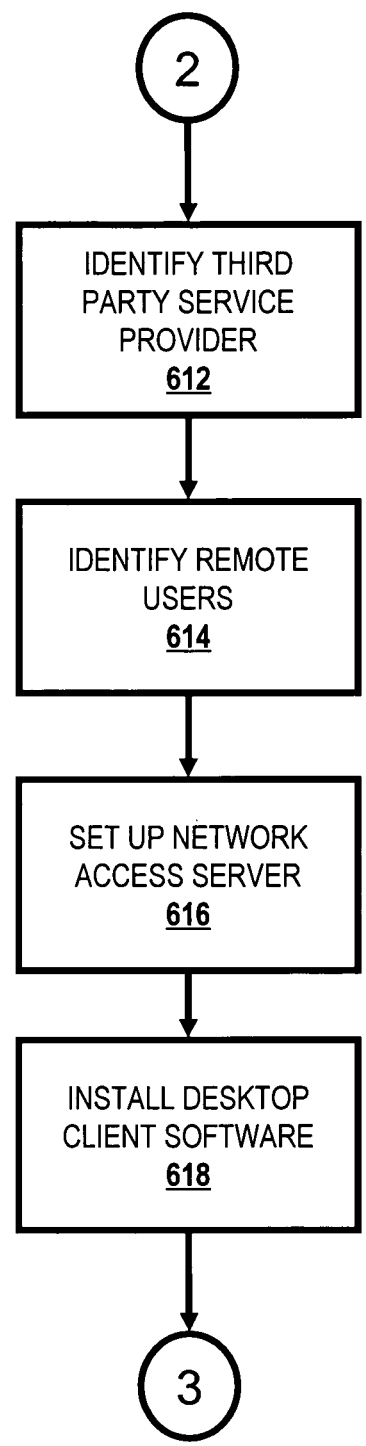

The process for such VPN deployment is described in FIGS. 6a-c. Initiator block 602 begins the Virtual Private Network (VPN) process. A determination is made to see if a VPN for remote access is required (query block 604). If it is not required, then proceed to query block 606. If it is required, then determine if the remote access VPN exists (query block 608).

If a VPN does exist, then proceed to block 610. Otherwise identify a third party provider that will provide the secure, encrypted connections between the company's private network and the company's remote users (block 612). The company's remote users are identified (block 614). The third party provider then sets up a network access server (NAS) (block 616) that allows the remote users to dial a toll free number or attach directly via a broadband modem to access, download and install the desktop client software for the remote-access VPN (block 618).

After the remote access VPN has been built or if it has been previously installed, the remote users can access the process software by dialing into the NAS or attaching directly via a cable or DSL modem into the NAS (block 610). This allows entry into the corporate network where the process software is accessed (block 620). The process software is transported to the remote user's desktop over the network via tunneling. That is, the process software is divided into packets and each packet including the data and protocol is placed within another packet (block 622). When the process software arrives at the remote user's desktop, it is removed from the packets, reconstituted and then is executed on the remote user's desktop (block 624).

A determination is then made to see if a VPN for site to site access is required (query block 606). If it is not required, then proceed to exit the process (terminator block 626). Otherwise, determine if the site to site VPN exists (query block 628). If it does exist, then proceed to block 630. Otherwise, install the dedicated equipment required to establish a site to site VPN (block 638). Then build the large scale encryption into the VPN (block 640).

After the site to site VPN has been built or if it had been previously established, the users access the process software via the VPN (block 630). The process software is transported to the site users over the network via tunneling (block 632). That is the process software is divided into packets and each packet including the data and protocol is placed within another packet (block 634). When the process software arrives at the remote user's desktop, it is removed from the packets, reconstituted and is executed on the site user's desktop (block 636). The process then ends at terminator block 626.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 7A:
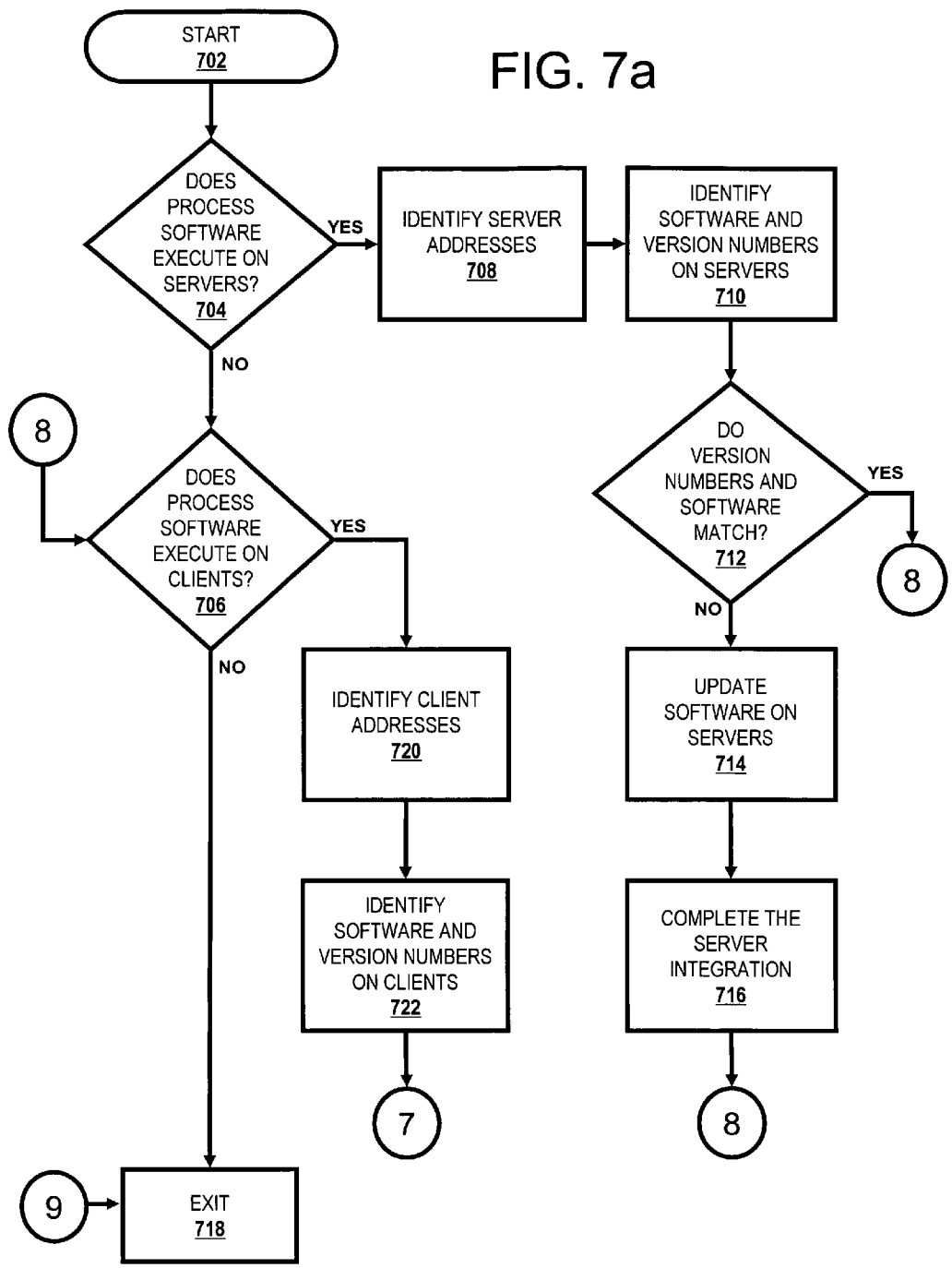
FIGS. 7*a-b* are flow-charts showing steps taken to integrate into an computer system software that is capable of executing the steps shown in FIGS. 1-2.
Figure 7B:
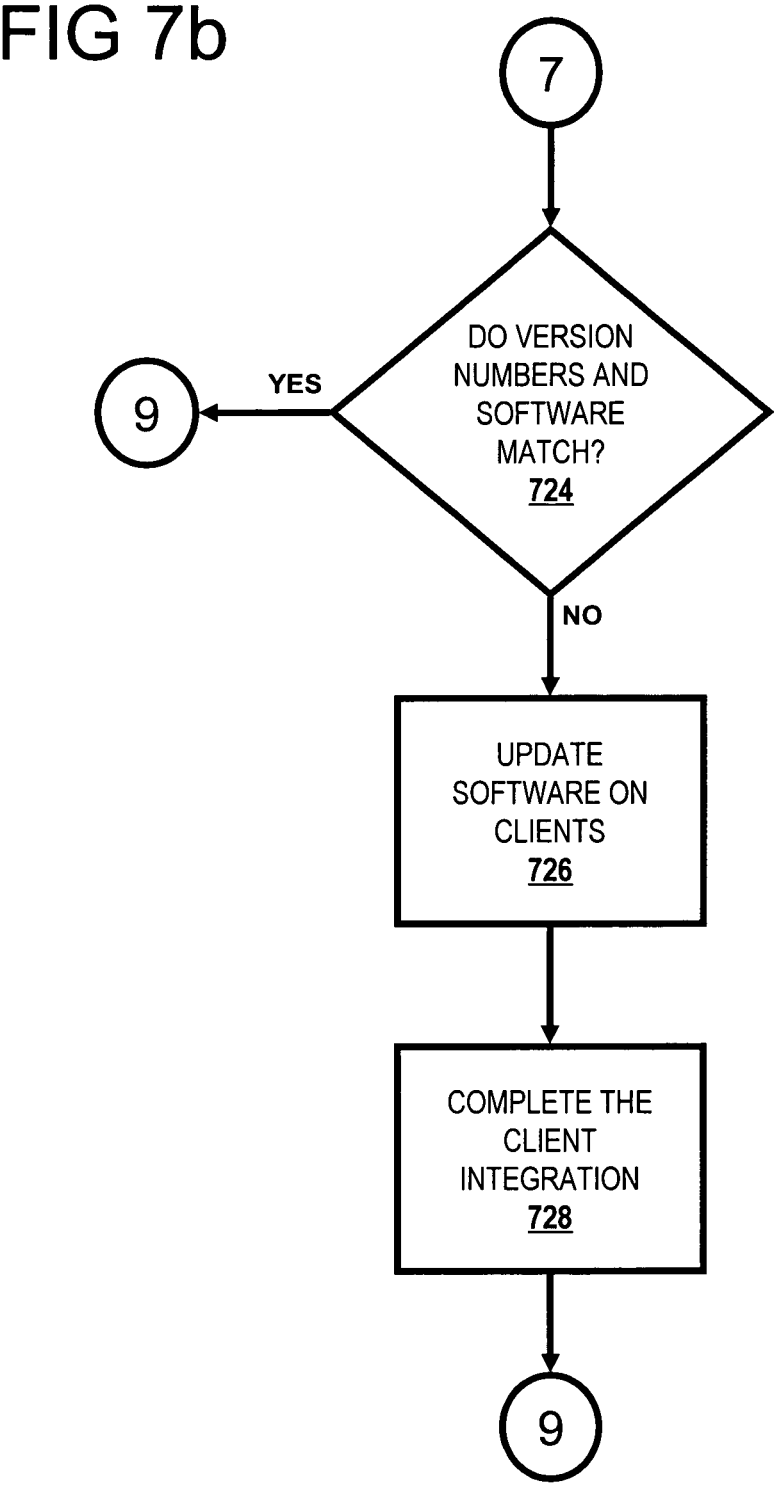

For a high-level description of this process, reference is now made to FIG. 7. Initiator block 702 begins the integration of the process software. The first tiling is to determine if there are any process software programs that will execute on a server or servers (block 704). If this is not the case, then integration proceeds to query block 706. If this is the case, then the server addresses are identified (block 708). The servers are checked to see if they contain software that includes the operating system (OS), applications, and network operating systems (NOS), together with their version numbers, which have been tested with the process software (block 710). The servers are also checked to determine if there is any missing software that is required by the process software in block 710.

A determination is made if the version numbers match the version numbers of OS, applications and NOS that have been tested with the process software (block 712). If all of the versions match and there is no missing required software the integration continues in query block 706.

If one or more of the version numbers do not match, then the unmatched versions are updated on the server or servers with the correct versions (block 714). Additionally, if there is missing required software, then it is updated on the server or servers in the step shown in block 714. The server integration is completed by installing the process software (block 716).

The step shown in query block 706, which follows either the steps shown in block 704, 712 or 716 determines if there are any programs of the process software that will execute on the clients. If no process software programs execute on the clients the integration proceeds to terminator block 718 and exits. If this not the case, then the client addresses are identified as shown in block 720.

The clients are checked to see if they contain software that includes the operating system (OS), applications, and network operating systems (NOS), together with their version numbers, which have been tested with the process software (block 722). The clients are also checked to determine if there is any missing software that is required by the process software in the step described by block 722.

A determination is made is the version numbers match the version numbers of OS, applications and NOS that have been tested with the process software (query block 724). If all of the versions match and there is no missing required software, then the integration proceeds to terminator block 718 and exits.

If one or more of the version numbers do not match, then the unmatched versions are updated on the clients with the correct versions (block 726). In addition, if there is missing required software then it is updated on the clients (also block 726). The client integration is completed by installing the process software on the clients (block 728). The integration proceeds to terminator block 718 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 8A:
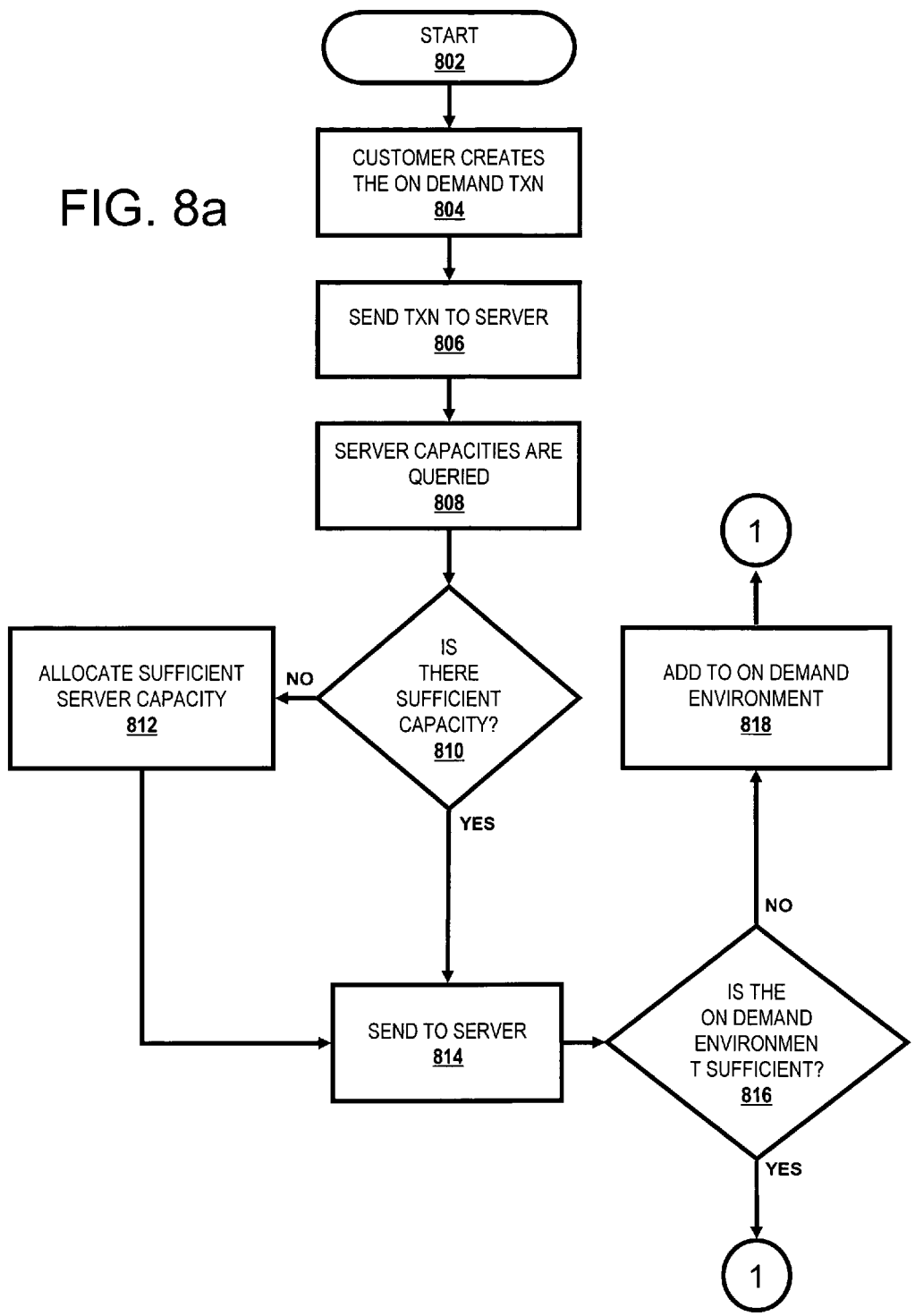
FIGS. 8*a-b* are flow-charts showing steps taken to execute the steps shown in FIGS. 1-2 using an on-demand service provider.
Figure 8B:
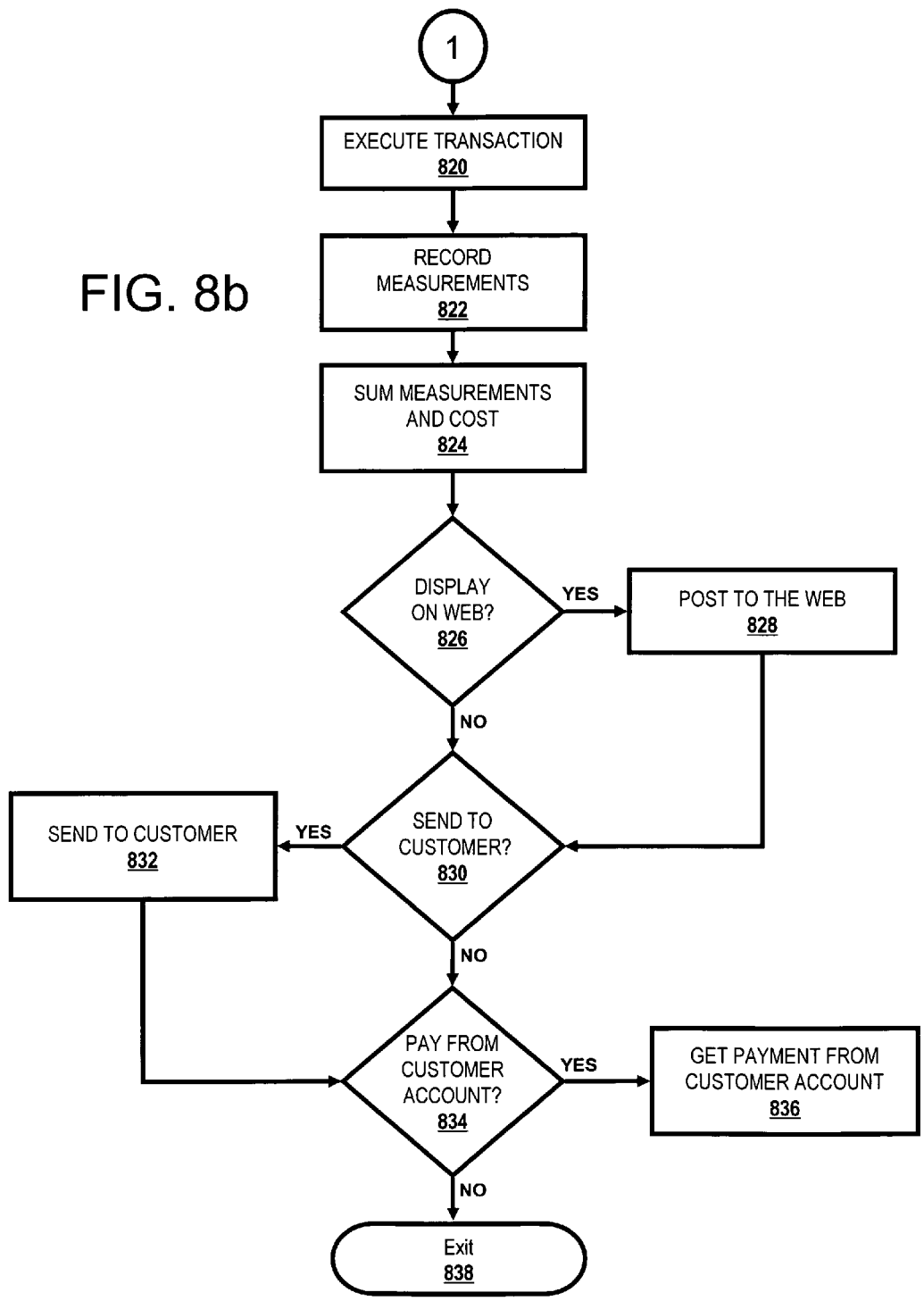

With reference now to FIGS. 8*a-b*, initiator block 802 begins the On Demand process. A transaction is created than contains the unique customer identification, the requested service type and any service parameters that further, specify the type of service (block 804). The transaction is then sent to the main server (block 806). In an On Demand environment the main server can initially be the only server, then as capacity is consumed other servers are added to the On Demand environment.

The server central processing unit (CPU) capacities in the On Demand environment are queried (block 808). The CPU requirement of the transaction is estimated, then the servers available CPU capacity in the On Demand environment are compared to the transaction CPU requirement to see if there is sufficient CPU available capacity in any server to process the transaction (query block 810). If there is not sufficient server CPU available capacity, then additional server CPU capacity is allocated to process the transaction (block 812). If there was already sufficient available CPU capacity then the transaction is sent to a selected server (block 814).

Before executing the transaction, a check is made of the remaining On Demand environment to determine if the environment has sufficient available capacity for processing the transaction. This environment capacity consists of such things as but not limited to network bandwidth, processor memory, storage etc. (block 816). If there is not sufficient available capacity, then capacity will be added to the On Demand environment (block 818). Next the required software to process the transaction is accessed, loaded into memory, then the transaction is executed (block 820).

The usage measurements are recorded (block 822). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 824).

If the customer has requested that the On Demand costs be posted to a web site (query block 826), then they are posted (block 828). If the customer has requested that the On Demand costs be sent via e-mail to a customer address (query block 830), then these costs are sent to the customer (block 832). If the customer has requested that the On Demand costs be paid directly from a customer account (query block 834), then payment is received directly from the customer account (block 836). The On Demand process is then exited at terminator block 838.

Method Invoking Rules

The methods described herein may be invoked by one or more rules. These rules may be specific for a resource, a network, an enterprise, or any other resource partition at any granularity. The rule can optionally be initiated by a policy. Resources are defined to include hardware as well as software resources.

Figure 9A:
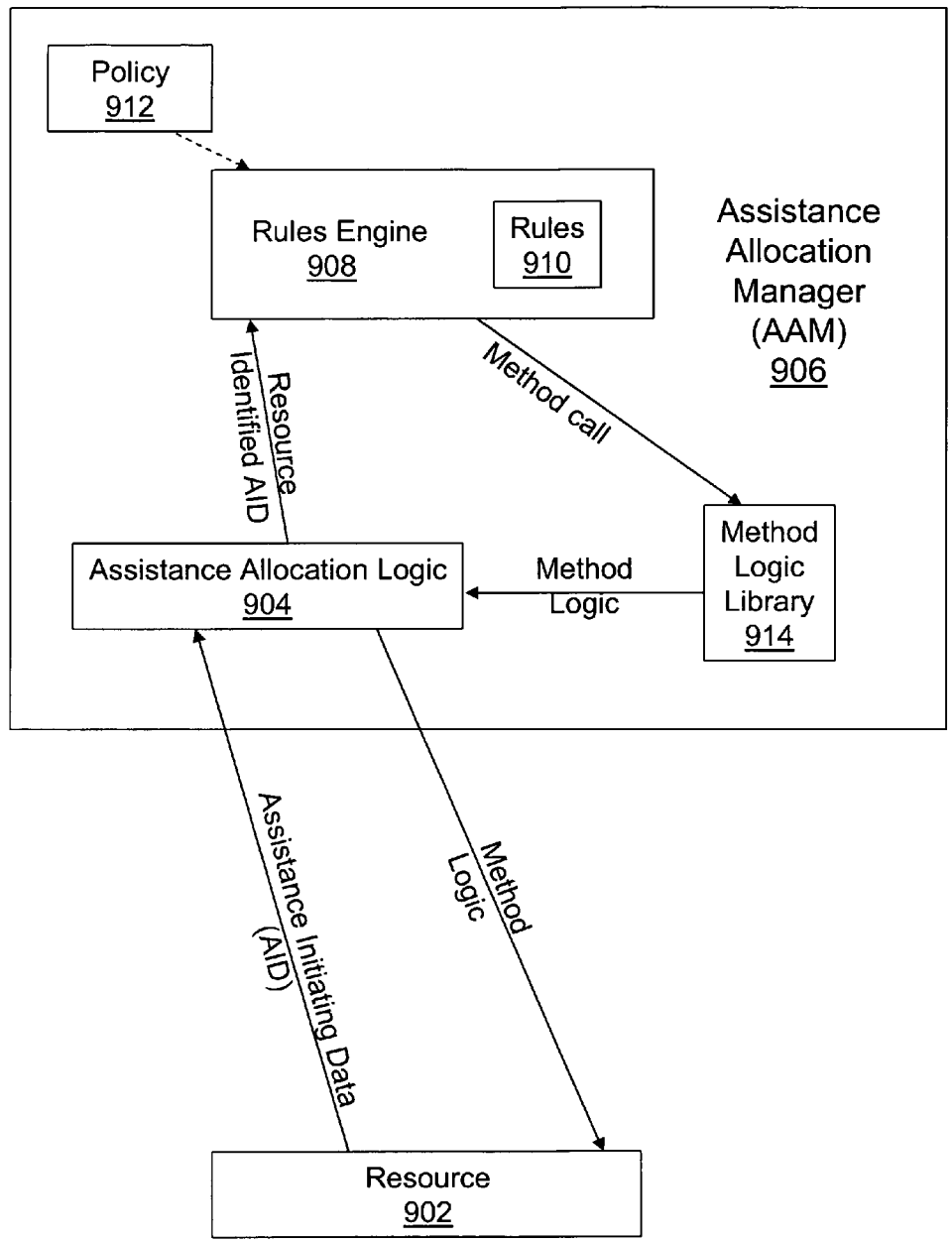

For example, consider the infrastructure and process shown in FIG. 9*a*. A resource 902, such as client computer 302 or a service provider server 402, sends an Assistance Initiating Data (AID) to an Assistance Allocation Logic (AAL) 904 in an Assistance Allocation Manager (AAM). The AID may be a request for another resource, such as a particular Webpage, portal resource (including portlets, etc.), control instructions, etc. The AID may also be performance data that is pushed or pulled from the resource 902. For example, resource 902 may issue an AID requesting delivery of web content, execution of a server-based application, access to a particular website or a particular software resource, including an application, a method/class, a portlet, etc. Alternatively, the AID may be performance data, such as data that describes CPU usage, clock speed, hardware temperature, the number of users (actual or allocated) of the resource, etc. Such examples of types of AID are exemplary only, and are not to limit the scope of the definition of an AID.

When AAL 904 receives an AID, AAL 904 recognizes the type of AID and the identifier for the resource that sent the AID. The AID may directly contain a type indicator (indicating that the AID is for a request for resource(s), performance data, etc.) as well as an identifier for the AID-sending resource, or the AID may be linked to metadata that supplies such information. This information (the AID plus the identifier for the specific resource 902 that sent the AID) is forwarded from the AAL 904 to a rules engine 908, which includes a library of rules 910. Note that the rules 910 may be initiated by and responsive to a policy 912. Policy 912 may be formulated by a person or software logic associated with AAM 906, the resource 902, or any other entity having authority to influence the formulation of the rules 910.

Rules engine 908, by executing a particular rule 910 for the resource-associated AID, issues a message to a method logic library 914. This message instructs the method logic library 914 to access a particular method logic—which implements in software, hardware, or a combination thereof, a novel method as described above in the foregoing figures. The ALL 904 forwards this method logic to the resource 902, which implements the inventive and novel method under the control of the particular rule from the library of rules 910.

With reference now to FIG. 9*b*, a flow-chart of exemplary steps taken to invoke a method by a rule is presented. After initiator block 916, a rule is invoked (block 918). This rule may be invoked in response to a message from a resource, or the rule may be invoked autonomously by an Assistance Allocation Manager (AAM). The AAM may be a web-based service, such as that offered by IBM® Global Services® (IGS™), using a Service Oriented Architecture (SOA) software service such as IBM's Websphere®. The SOA software includes a bottom level of applications (pieces of code that perform some useful function), a middle level of Web services (infrastructure for accessing the applications), and a top layer of business processes (steps taken to call the Web services). Thus, in a preferred embodiment, the AAM is a third party service that manages resources for a customer.

Continuing with FIG. 9*b*, a query is made of the invoked rule to determine and/or confirm that the invoked rule is applicable to a particular resource (block 920). If so, then a determination is made regarding which method is called by the invoked rule (block 922). The appropriate method is then called and implemented in the appropriate resource (block 924), and the process ends (terminator block 926).

As described here, the present invention provides a method and process to centralize the management of those files that have been identified as "technical records" across an organization. A "technical record" is defined as a data file that has at least the following characteristics. First, the data file must be stored following a strict naming convention (at a minimum, identification and data type are required). Second, the data file must contain a certain classification level in which authorization can be granted upon (such as those covered by organizational, and/or governmental rules and regulations).

In one embodiment, the invention relies on a Service-Oriented Architecture approach to provide a method and process to centralize the following tasks related to managing technical records: 1) authentication/authorization system; 2) transparent multi-server repository communication; 3) automatic naming and storage conventions; and 4) advanced data integrity verification system. Note that the multi-servers may be remote from a requesting client machine, or alternatively, communication can be to a client machine's local file system. In either scenario, the present invention is designed to allow the client machine to access a technical record at a location that is initially unknown to the client machine.

A Client Program requires certain parameters in order to perform a communication with a Technical Records Repository. This Client Program then utilizes a Technical Records Security Service that will also require certain parameters in order to authenticate and authorize the user based on how they have asked to communicate with a repository. If the user is determined authentic and authorized, a resource bundle will be passed back to the Client Program. The resource bundle will contain all the resources needed by the Client Program to initiate communication with the server(s) that represent the Technical Records Repository (the repository could be represented by multiple servers). Following a successful communication, a transaction entry is passed to a Technical Records Data Integrity Service, in which the transaction entry can be used to perform data integrity verification. This service also logs any important details about the communication that may be needed later to further check/verify the integrity of the communication (data such as the user ID, date/time, and checksum value are often valuable to store for later use).

One advantage of the present invention is all the important and critical data management strategies of the organization have been isolated within the Technical Records Security and Data Integrity Services. This allows for a greater level of control over the Technical Records Repositories, ultimately making these repositories more manageable by the organization. This Service-Oriented Architecture approach also allows for platform independence and/or language independence between the Client Program and the Technical Records Security and Data Integrity Services. By utilizing a Service-Oriented Architecture approach, the Technical Records Security and Data Integrity Services can be implemented in one language running on a particular platform, while the Client Program can be implemented in a completely different language that is running on a completely different platform.

Using the centralized Technical Records Security and Data Integrity Services system described herein provides the following useful advantages.

First, the Technical Records Security Service provides for a centralized authentication/authorization system, which allows for a company wide security strategy to be used and applied over the entire collection of Technical Records Repositories being managed. The user will be required to pass in certain authentication credentials. These authentication credentials are then passed on to the Technical Records Security Service, which decides if the user is both authentic and authorized to do the task they are requesting. In this way the most appropriate authentication/authorization strategy can be applied, and since it has been centralized, it is much easier to control and manage this strategy across the organization.

Second, the Technical Records Security Service will process the user's credentials along with what the user is asking to do. The Technical Records Security Service decides, based on the current Technical Records Repositories infrastructure, what resources are needed by the Client Program to establish the appropriate communication with the server(s) that physically make up the technical records repository. This physical communication effectively becomes transparent to the end user. That is, the end user simply provides an identifier name for the repository that he would like to communicate with, what kind of communication he would like to perform, and the appropriate user credentials to do so, but there is never a need for the end user to know what physical servers are actually being communicated with. In this way, both data migration efforts and multi-server repository architectures can easily be managed.

Third, the Technical Records Security Service can apply automatic naming and storage conventions to the transaction being requested. Based on certain inputs from the user, (such as what repository is being communicated with, how the file is classified, and what the data type of the file is, along with the physical server details that have been configured with the Security Service), the Service can automate the naming and storage conventions used. That is, the Service can use certain rules to automatically name the file being stored and generate a directory path for where the file is to be stored or retrieved from. This detail is then added to the resource bundle that is passed back to the Client Program, which is then used by the Client Program in the actual communication protocol.

Fourth, advanced data integrity is also isolated within a service called the Technical Records Data Integrity Service. This service is responsible for applying any integrity algorithms/rules on the data entry received, as well as logging any results/information that may be needed in the future to further apply integrity verification on the communications that have taken place.

Without the present invention a company must rely on a slew of non-centralized data management strategies throughout its organizations. For example, assume that a company (named XYZ) is made up of three organizations, named A, B, and C. Assume further that organization A has two technical repositories (called R1 and R2), organization B has a single technical repository (called R3), and organization C also has a single technical repository (called R4). Assume further, for exemplary purposes only, that all four of these repositories have their own dedicated hardware (i.e., a total of four physical servers are used). Without the present invention, each organization must manage their respective technical repositories (and server hardware), and the company may or may not be able to effectively communicate to each organization the company wide strategy for managing such repositories. Without the present invention, each organization would also have to dedicate some resources to managing the security and data integrity strategies on the repositories. Furthermore, without the present invention, some of the hardware may be grossly under utilized throughout the company.

By utilizing the present invention, company XYZ benefits in the following ways. First, a major benefit will be seen in a cost savings to the company. In the example described above, company XYZ can save in both hardware usage and personal needed to manage the repositories across the company.

For exemplary purposes, assume further that company XYZ performs a quick evaluation of the current hardware used in organizations A, B, and C, and finds that the hardware used for repositories R1 and R4 are very under utilized and contain more than enough space and processing power to support the needs of all four repositories of the company. Company XYZ may decide it makes business sense to consolidate the hardware used by these repositories. The present invention provides the following advantages to such a consolidation. First, the present invention makes the repositories more conceptual in nature to the end users by defining a meaningful identifier name for each of the repositories. Second, the present invention provides a method to design and implement the security and integrity service strategies for each identified repository (centrally defines both authentication/authorization rules, plus naming and storage convention rules that are to apply). Third, the present invention configures the security service to allow for multi-server file movement (this will be used during the migration of the data to the consolidated hardware). Fourth, the present invention provides the Client Program to the end user community By utilizing the described steps of the present invention in the present example, company XYZ will be ready to migrate the technical records from repositories R2 and R3 to the consolidated hardware currently used for repositories R1 and R4. In addition to making the migration transparent to the end user community, company XYZ has also now implemented a process that centralizes the data management strategy for managing all the technical records across its respective organizations A, B, and C. This will also allow for easy enhancement to security measures over these technical repositories, giving the company a greater level of control over any sensitive technical records they want to protect (such as insuring that any government contracts are in compliance with strict security controls over any related technical records). Lastly, company XYZ now has consolidated its hardware, thus freeing up both hardware and personal, which can then be redeployed to manage other resources of the organization.

The present invention thus provides method, system and computer-readable medium for managing technical records. In one embodiment, the method includes the step of controlling access to a technical records repository through a centralized technical records security service, wherein the technical records security service controls access to multiple independent technical records repositories for an enterprise, wherein technical records must follow a strict naming convention set by the enterprise, and wherein the technical records must contain a specific security classification level set by the enterprise. Access to the technical records repository may be controlled, for a requesting user, by the centralized technical records security service wherein the centralized technical records security service determines which authorization strategy, from a plurality of authorization strategies, is appropriate for the requesting user. In one embodiment, the method further includes the steps of: receiving, from the requesting user, an identifier name of a repository with which the requesting user desires to access requested data; based on the identifier name received from the requesting user, determining an actual name for a physical server that holds the requested data, wherein the centralized technical records security service hides a name and pathway to the physical server, which holds the requested data, from the requesting user; automatically applying, by the centralized technical records security service, naming and storage conventions that name a file being stored and generate a directory path for where the file is to be stored; and transmitting a file name, directory path for the file, host name of the server that holds the requested technical records (data), logon parameters to be used, etc., to the requesting user for use by a client program in actual communication protocol with the requested data. That is, a resource bundle that is transmitted back to the requesting user, for use by the client program in the actual communication protocol with the physical server(s) that represent the technical records repository, will contain all resources needed to perform the actual communication protocol with the physical server(s) that represent the technical records repository. This resource bundle includes, but is not limited to, the file name, the directory path to store the technical record, connection related resources (host name, connection ID and password, number of retry attempts, priority/ranking of servers (priority/ranking strategy used for downloads when multiple servers represent the technical records repository), etc.). The method may further include the steps of utilizing a technical records data integrity service, which is part of the technical records security service, for: applying an integrity rule, which describes which integrity algorithm, must be applied to the requested data, to the requested data; and logging a record of interface information previously used when retrieving the requested data. In one embodiment, the method further includes the steps of receiving, by an Assistance Allocation Manager (AAM), an Assistance Initiating Data (AID) from a resource in a data processing system; and in response to receiving the AID, executing a rule, in the AAM, that is specific for the AID and the resource that sent the AID, wherein executing the rule in the AAM causes the steps described herein to be executed for the resource that sent the AID.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method for managing technical records, the method comprising:
controlling, using a data processing system, access to a technical records repository through a centralized technical records security service, wherein the technical records security service controls access to multiple independent technical records repositories for an enterprise, wherein technical records follow a strict naming convention set by the enterprise, and wherein each of the technical records include a specific security classification level set by the enterprise;
setting up and running a multi-server file communication between a client system and the technical records repository;
in response to receiving a request for data, applying an integrity rule to a requested data via a technical records data integrity service that provides details of past transactions between the client system and the technical records repository;
logging a record of interface information previously used when retrieving the requested data;
facilitating integrity verification of an associated communication using the logged record;
in response to validation of credentials of a user, returning a resource bundle containing all resources needed to perform an actual communication being requested, wherein the resources in the returned resource bundle contain details on whether a multi-server communication must take place, the naming and storage conventions that are to be used, which describes exactly how a file is to be named when stored, and exactly where the file is to be stored on a remote repository, including a physical location/address;
authorizing the requested user to access the technical records repository, without identifying a physical name of the server or a physical path way to the technical records repository; and
matching of a name and pathway to the technical records repository for use by a requesting user, wherein the matching is performed by an algorithm from among: using a lookup table that matches the name of the physical location of the technical records repository with the identifier name; using a configuration file that points to the technical records repository; and a coded algorithm that may be unique for the technical records repository's storage system, wherein a choice of an algorithm is based on organization naming and storage conventions utilized by the technical records repository.

2. The method of claim 1, further comprising:
receiving, from the requesting user, an identifier name of a repository with which the requesting user desires to access requested data; and
based on the identifier name received from the requesting user, determining an actual name for a physical server that holds the requested data, wherein the centralized technical records security service hides a name and pathway to the physical server, which holds the requested data, from the requesting user.

3. The method of claim 2, further comprising:
automatically applying, by the centralized technical records security service, naming and storage conventions that name a file being stored and generate a directory path for where the file is to be stored.

4. The method of claim 3, further comprising:
transmitting, to a client program in a client computer that is used by the requesting user, communication protocol information needed by the client program to access the requested data in the technical records repository, wherein the communication protocol information includes a file name for the requested data, a directory path to the requested data, a host name of the server that holds the requested data, and logon parameters to be used for accessing a server that holds the requested data.

5. The method of claim 1, further comprising:
receiving, by an Assistance Allocation Manager (AAM), an Assistance Initiating Data (AID) from a resource in a data processing system; and
in response to receiving the AID, executing a rule, in the AAM, that is specific for the AID and the resource that sent the AID, wherein executing the rule in the AAM causes the steps described in claim 1 to be executed for the resource that sent the AID.

6. A system comprising:
a processor;
a data bus coupled to the processor;
a memory coupled to the data bus; and
a computer-usable medium embodying computer program code, the computer program code comprising instructions executable by the processor and configured for:
controlling access to a technical records repository through a centralized technical records security service, wherein the technical records security service controls access to multiple independent technical records repositories for an enterprise, wherein technical records follow a strict naming convention set by the enterprise, and wherein the technical records-include a specific security classification level set by the enterprise;
receiving, from the requesting user, an identifier name of a repository with which the requesting user desires to access requested data;

based on the identifier name received from the requesting user, determining an actual name for a physical server that holds the requested data, wherein the centralized technical records security service hides a name and pathway to the physical server, which holds the requested data, from the requesting user;

receiving, by an Assistance Allocation Manager (AAM), an Assistance Initiating Data (AID) from a resource in a data processing system; and in response to receiving the AID, executing a rule, in the AAM, that is specific for the AID and the resource that sent the AID, wherein executing the rule in the AAM causes the steps described in claim 1 to be executed for the resource that sent the AID;

applying an integrity rule, which describes which of multiple integrity algorithms to apply to the requested data;

logging a record of interface information previously used when retrieving the requested data to facilitate integrity verification of an associated communications;

in response to validation of credentials of a user, return a resource bundle containing all resources needed to perform an actual communication being requested, wherein the resources in the returned resource bundle contain details on whether a multi-server communication must take place, the naming and storage conventions that are to be used, which describes exactly how a file is to be named when stored, and exactly where the file is to be stored on a remote repository, including a physical location/address;

authorize the requested user to access the technical records repository without identifying a physical name of the server or a physical path way to the technical records repository; and match of a name and pathway to the technical records repository for use by a requesting user, wherein the matching is performed by an algorithm from among: using a lookup table that matches the name of the physical location of the technical records repository with the identifier name; using a configuration file that points to the technical records repository; and a coded algorithm that may be unique for the technical records repository's storage system, wherein a choice of an algorithm is based on organization naming and storage conventions utilized by the technical records repository.

7. A non-transitory computer-readable medium embodying computer program code for managing technical records, the computer program code comprising computer executable instructions configured for:

controlling access to a technical records repository through a centralized technical records security service, wherein the technical records security service controls access to multiple independent technical records repositories for an enterprise, wherein technical records follow a strict naming convention set by the enterprise, and wherein each of the technical records include a specific security classification level set by the enterprise;

setting up and running a multi-server file communication between a client system and the technical records repository;

in response to receiving a request for data, applying an integrity rule to a requested data via a technical records data integrity service that provides details of past transactions between the client system and the technical records repository;

logging a record of interface information previously used when retrieving the requested data to facilitate integrity verification of an associated communications;

in response to validation of credentials of a user, returning a resource bundle containing all resources needed to perform an actual communication being requested, wherein the resources in the returned resource bundle contain details on whether a multi-server communication must take place, the naming and storage conventions that are to be used, which describes exactly how a file is to be named when stored, and exactly where the file is to be stored on a remote repository, including a physical location/address;

authorizing the requested user to access the technical records repository, without identifying a physical name of the server or a physical path way to the technical records repository; and matching of a name and pathway to the technical records repository for use by a requesting user, wherein the matching is performed by an algorithm from among: using a lookup table that matches the name of the physical location of the technical records repository with the identifier name; using a configuration file that points to the technical records repository; and a coded algorithm that may be unique for the technical records repository's storage system, wherein a choice of an algorithm is based on organization naming and storage conventions utilized by the technical records repository.

8. The non-transitory computer-readable medium of claim 7, wherein access to the technical records repository is controlled, for a requesting user, by the centralized technical records security service, and wherein the computer executable instructions are further configured for:

transmitting, to a client program in a client computer that is used by the requesting user, communication protocol information needed by the client program to access the requested data in the technical records repository, wherein the communication protocol information includes a file name for the requested data, a directory path to the requested data, a host name of the server that holds the requested data, and logon parameters to be used for accessing a server that holds the requested data.

9. The non-transitory computer-readable medium of claim 8, wherein the centralized technical records security service determines which authorization strategy, from a plurality of authorization strategies, is appropriate for the requesting user.

10. The non-transitory computer-readable medium of claim 9, wherein the computer executable instructions are further configured for:

receiving, from the requesting user, an identifier name of a repository with which the requesting user desires to access requested data; and based on the identifier name received from the requesting user, determining an actual name for a physical server that holds the requested data, wherein the centralized technical records security service hides a name and pathway to the physical server, which holds the requested data, from the requesting user.

11. The non-transitory computer-readable medium of claim 10, wherein the computer executable instructions are further configured for:

automatically applying, by the centralized technical records security service, naming and storage conventions that name a file being stored and generate a directory path for where the file is to be stored.

12. The non-transitory computer-readable medium of claim 11, wherein the computer executable instructions are further configured for:

transmitting, to a client program in a client computer that is used by the requesting user, communication protocol information needed by the client program to access the requested data in the technical records repository, wherein the communication protocol information includes a file name for the requested data, a directory path to the requested data, a host name of the server that holds the requested data, and logon parameters to be used for accessing a server that holds the requested data.

13. The non-transitory computer-readable medium of claim 7, wherein the computer executable instructions are further configured for:
   receiving, by an Assistance Allocation Manager (AAM), an Assistance Initiating Data (AID) from a resource in a data processing system; and
   in response to receiving the AID, executing a rule, in the AAM, that is specific for the AID and the resource that sent the AID, wherein executing the rule in the AAM causes the steps described in claim 1 to be executed for the resource that sent the AID.

14. The non-transitory computer-readable medium of claim 7, wherein the computer executable instructions are deployable to a client computer from a download server that is at a remote location.

15. The non-transitory computer-readable medium of claim 7, wherein the computer executable instructions are provided by a download service provider to a client computer on an on-demand basis.

* * * * *